J. J. LAWLER.
MIXING VALVE.
APPLICATION FILED JUNE 1, 1908.

956,860.

Patented May 3, 1910.

WITNESSES
Edgar M. Greenbaum
Arthur E. Dempsey

INVENTOR
James J. Lawler,
BY
E. F. Gennert
ATTORNEY

UNITED STATES PATENT OFFICE.

JAMES J. LAWLER, OF MOUNT VERNON, NEW YORK.

MIXING-VALVE.

956,860. Specification of Letters Patent. Patented May 3, 1910.

Application filed June 1, 1908. Serial No. 436,097.

*To all whom it may concern:*

Be it known that I, JAMES J. LAWLER, a citizen of the United States, and resident of Mount Vernon, in the county of Westchester and State of New York, have invented certain new and useful Improvements in Mixing-Valves, of which the following is a specification.

My invention relates to an improvement in valves in which hot and cold water, or other liquid, enters through two separate inlets which inlets are controlled by a duplex regulating means the object being to produce a simple device capable of being automatically regulated by the temperature of the water discharged from said valve or otherwise actuated according to the conditions under which said valve is used.

Some arts, such as dyeing of fabrics, chemical baths and so forth, require running water of a specific temperature. In hospitals, sanitariums and even in private houses, baths are frequently taken with the water at a certain temperature. I have found in practice, that when a mixing valve, as hereinafter described, is used in connection with the thermostatic regulator for which a patent was granted to me on July 10, 1906, Number 825328, a constant flow of water having an unvarying degree of temperature will be delivered by the valve.

My improved valve is shown in the accompanying drawing in which—

Figure 1:
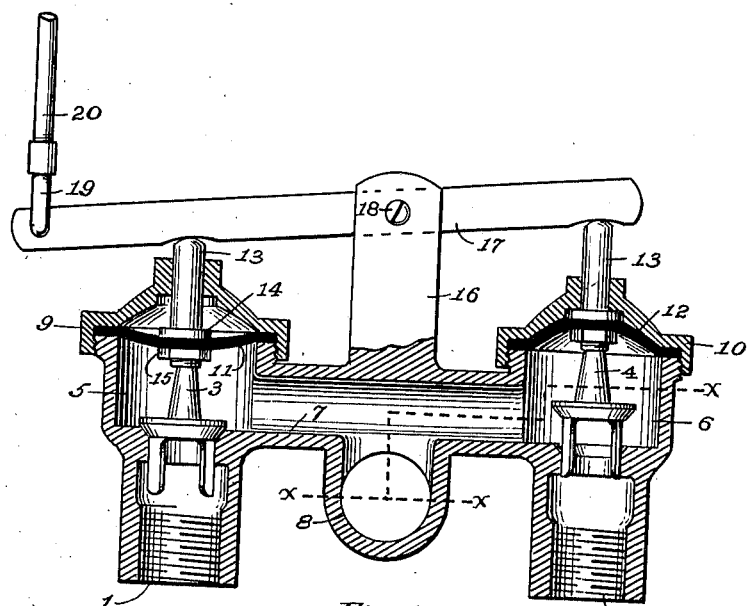
Figure 2:
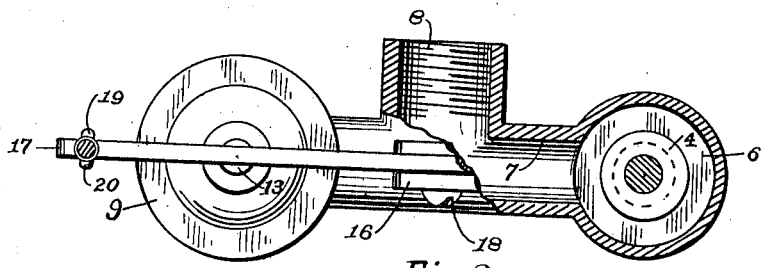

Figure 1 is a central sectional elevation, one valve being open and the other one closed, and Fig. 2 is a plan partly in section on lines X, X, X, of Fig. 1.

Similar reference characters designate like parts in the two views.

The body is of a casting, having an inlet 1, for hot water and an inlet, 2, for cold water. Each inlet is controlled by a valve respectively, 3—4, which has a seating in the valve chambers 5—6 as shown. The two inlets and valve chambers connect with a mixing chamber 7 having an outlet 8. The caps 9—10 screw down on the valve chambers and hold flexible diaphragms 11—12 in place; a valve stem 13 passes through and is guided by the cap, the stem being fastened to the diaphragm by a washer 14 and nut 15 as shown. The valves are not attached to these stems, but are loose and free to act, for the purpose as explained in the operation. Midway between the two valve chambers, I prefer to mount a pedestal 16 upon which a lever 17 articulates, the lever extending to and beyond each of the valve stems and being longer, preferably, on the hot water inlet side or end. The pedestal may be slotted and the lever placed in said slot, the screw 18 acting as a bearing or fulcrum point. An eye 19 and rod 20 is attached to the longer end of the lever, and connects with any suitable controlling means, not shown.

Such being the construction, the operation is as follows: We will assume that all the water connections have been made to the valve, the outlet being connected to the inlet of the thermostatic regulator first mentioned, or connected to any other operative means which is actuated by heat or cold. When both hot and cold water are turned on, the pressure will raise the valves up from their seats, pressing upwardly against the stems of the diaphragms, which in turn are pressed upward until the outer ends of the stems bear against the under side of the lever, the water passing off through the outlet. The lever is then adjusted so as to proportion the hot and cold water, any variations in the temperature being equalized by the regulator (not shown) a movement in one or the other direction changing or doubling the ratio, that is to say, a movement for closing off the hot water permits an increased supply of cold water to enter, the valve rising from its seat by the pressure of the water, when the lever pressure is removed, and vice versa.

It will be noticed that by attaching the stems to the flexible diaphragms and fastening said diaphragms in place as shown, a water tight sliding joint is had between the stem and the cover, thus producing very little friction.

The lever, being fulcrumed in the center and bearing on the stems above each valve, is actuated with slight power, and as the valves are loose from the stems and diaphragms, they also act as check valves against the return of water or back pressure in the chamber 7.

What I claim is:—

In a mixing valve, a pair of valve chambers, one of said chambers provided with a hot water inlet and the other of said chambers with a cold water inlet, means to constitute a conduit communicating with each of said chambers and provided with an outlet, each of said valve chambers provided with a valve seat, a valvular body arranged in each of said chambers and adapted to engage the seat in its respective chamber, a diaphragm extending across the top of each of said chambers and bearing against the valvular body in the chamber, a cap for closing each of said chambers, arranged above the diaphragm and securing the diaphragm in position, a stem arranged above and engaging and disconnected from each of said diaphragms, said stems extending through said caps, a pedestal formed integral with the means to constitute said conduit, and a lever fulcrumed to said pedestal and detachably engaging said stems and adapted when shifted to move the stem to adjust the valvular body, said valvular body being independent of the lever and stem whereby they can automatically act to shut off back pressure from the outlet.

Signed at New York city in the county of New York and State of New York this 25th day of May A. D. 1908.

JAMES J. LAWLER.

Witnesses:
G. H. CLARK,
FRED L. BRANDT.